(12) United States Patent
Brock

(10) Patent No.: US 8,777,184 B2
(45) Date of Patent: Jul. 15, 2014

(54) GATE VALVE

(76) Inventor: Tom J. Brock, Franklin, IN (US)

(*) Notice: Subject to any disclaimer, the term of this patent is extended or adjusted under 35 U.S.C. 154(b) by 276 days.

(21) Appl. No.: 13/487,161

(22) Filed: Jun. 2, 2012

(65) Prior Publication Data

US 2012/0313023 A1    Dec. 13, 2012

Related U.S. Application Data

(60) Provisional application No. 61/496,533, filed on Jun. 13, 2011.

(51) Int. Cl.
*F16K 25/00* (2006.01)

(52) U.S. Cl.
USPC .......................................................... 251/202

(58) Field of Classification Search
USPC .......................... 251/178, 193–204, 326, 327
See application file for complete search history.

(56) References Cited

U.S. PATENT DOCUMENTS

| 600,181 | A | | 3/1898 | Smith |
|---|---|---|---|---|
| 650,989 | A | * | 6/1900 | Ranoe ........................... 251/198 |
| 2,653,789 | A | * | 9/1953 | Eichenberg .............. 137/246.12 |
| 4,573,660 | A | | 3/1986 | Husted |
| 6,164,622 | A | | 12/2000 | Partridge |
| 6,234,197 | B1 | * | 5/2001 | McKiernan et al. .......... 137/526 |

* cited by examiner

*Primary Examiner* — John K Fristoe, Jr.
*Assistant Examiner* — Hailey K Do
(74) *Attorney, Agent, or Firm* — Roberts IP Law; John Roberts

(57) ABSTRACT

Disclosed is an expanding gate valve that expands the gate assembly by engagement of symmetrical opposing inclined cam surfaces with corresponding symmetrical opposing wedges, where at least one of the wedges is driven by the stem that moves the gate assembly, and where the gate assembly is urged back toward the retracted position by at least one lateral-force-inducing member at least when the gate assembly is not in the closed position. Example compact and full body gate valve designs are disclosed. Lateral-force-inducing members may comprise one or more springs, such as a snap-ring, or may comprise cam followers running against surfaces defining the gate members' movement profile. A sealed sleeve is also disclosed that seals the interior of the valve body from pressure in the pipeline when the valve is open, while allowing the gate assembly to expand and retract laterally.

18 Claims, 10 Drawing Sheets

GATE VALVE

CROSS-REFERENCE TO RELATED APPLICATIONS

This application claims the benefit of U.S. Provisional Application No. 61/496,533 to Tom J. Brock entitled Gate Valve, filed Jun. 13, 2011, the entirety of which is incorporated herein by reference.

FEDERALLY SPONSORED RESEARCH OR DEVELOPMENT

None.

TECHNICAL FIELD

The invention relates to improvements in valves, and particularly to the class of valves known as gate valves.

BACKGROUND

A gate valve, also known as a slab valve, is a valve for use in pipelines and the like, which opens and shuts by laterally translating a "gate" out of and into the path of the fluid in the pipeline. Typically, within a valve body structure a gate member is movable by a linearly-movable valve stem between an open position, where flow of fluid through inlet and outlet passages is permitted, and a closed position where the gate member blocks the flow of fluid through the inlet and outlet passages. In a "full body" design, the gate member may define a flow port that is aligned with the flow passages in the open position of the gate and segment assembly. In compact or "short body" gate valves, the gate member may be non-ported, in which case it is opened by the actuating stem of the valve to an open position where it is retracted to a position within the bonnet structure of the valve body and substantially clear of the flow passages.

Gate valves are primarily used to permit or prevent the flow of liquids. Gate valves are often used when a straight-line flow of fluid and minimum restriction is desired. Gate valves are typically designed to be operated in the fully opened and fully closed positions, and are not typically used for regulating flow. When fully open, a typical gate valve has no obstruction in the flow path, resulting in very low friction loss and pressure drop. The sealing faces on the gate can form a wedge shape or they can be parallel. Gate valves may have flanged ends that are drilled according to pipeline compatible flange dimensional standards. Gate valves are typically constructed from steel and cast iron.

Typical gate valves shut off flow in a pipeline by sealing against the low-pressure "downstream" side of the valve housing the force generated by the fluid in the high-pressure "upstream" side of the valve. As the gate is moved into the flow path of the fluid, the moving fluid pushes the gate against the downstream side of the housing, covering up and sealing the downstream flow path. This inherent functionality of typical gate valves has many drawbacks. First, to the extent the valve relies on pressure from one direction to seal, loss of pressure in that direction or gains in pressure from the other direction in the pipeline may cause the valve to lose its seal. Second, the functionality of the seals in a typical gate valve cannot be tested onsite without opening or operating the entire pipeline system to see if shutting off a particular valve shuts down the flow in the system. This can be time consuming, expensive, or impractical in large installations with a number of valves.

To address some of the problems with typical gate valves there have been multiple attempts to create "expanding" gate valves that do not rely on upstream pressure to affect a seal. Expanding gate valves have employed various mechanisms that tend to expand the thickness of the gate when it is translated into its fully shut position, thereby theoretically causing the gate to seal against both the upstream and downstream sides of the valve body using only the mechanical force of shutting the valve. Theoretically, once an expanding gate valve is fully expanded and sealed in the shut position, then both the low and high pressure sides of the pipeline are blocked, and then the pressure inside the valve body can be bled-off. This safely isolates the upstream and downstream pipes with redundant seals. Also, the pressure inside the valve body can be remotely monitored after the bleeding to detect any subsequent seal failures. This desirable functionality is called "double block and bleed."

While multiple attempts have been made to achieve a well-functioning expanding gate valve, each of the prior designs has important real-world drawbacks. By way of example and not limitation, each of the previously-known expanding gate valves exhibit one or more of the problems: they were larger than typical gate valves and thus could not fit into existing pipelines as a direct replacement for regular gate valves; they would not apply consistent force across the face of the seal, which leads to leaks and binding; they would tend to seal against pressure better in one direction than the other; they would forcefully drag the face of seal across the sealing surface during engagement and/or disengagement, which tends to damage the seal; they required a large amount of force to actuate, requiring larger and more expensive actuators; they would tend to get "stuck" in place once actuated; they would not expand and seal in both the open and closed positions; they would not operate smoothly and consistently; when open, they did not provide a consistent inner surface with the pipeline, which creates pressure drops and interferes with cleaning "pigs" that are run through the lines; they would be complicated and expensive to manufacture; they required special tools to service; and they would be prone to failure. An improved expanding gate valve with double-block-and-bleed functionality that overcomes these drawbacks has been needed for many years.

SUMMARY

The present invention solves these problems and more by providing a gate valve that expands the gate assembly by engagement of symmetrical opposing inclined cam surfaces with corresponding symmetrical opposing wedges, where at least one of the wedges is driven by the stem that moves the gate assembly, and where the gate assembly is urged back toward the retracted position by at least one lateral-force-inducing member at least when the gate assembly is not in the closed position.

Accordingly, provided in one example embodiment is a an expanding gate valve, comprising: (a) a valve body having a valve chamber and inlet and outlet passages and having spaced interior sealing surfaces; (b) a gate assembly comprising first and second gate members and being movable within the valve chamber to an open position permitting flow of fluid through the inlet and outlet passages and a closed position with the gate assembly located between the sealing surfaces and blocking the flow of fluid through the inlet and outlet passages, the gate members each defining an outer-facing surface facing in the direction of a corresponding interior sealing surface of the valve body, and an inner-facing surface facing the other gate member, the inner-facing surface of each gate member further defining an upper inclined cam surface and a lower inclined cam surface, the upper inclined cam surface symmetrical with the lower inclined cam surface about a latitudinal axis, the upper and lower inclined cam surfaces of the first gate member being symmetrical with the upper and lower inclined cam surfaces of the second gate member about a longitudinal axis, the upper and lower inclined cam surfaces disposed for engagement with opposed upper and lower wedges, respectively, and causing lateral expansion of said gate assembly responsive to engagement of the upper and lower wedges with the upper and lower inclined cam surfaces; (c) a valve stem having driving connection with the upper wedge and the gate assembly for moving the gate assembly linearly to said open and closed positions; and (d) at least one lateral-force-inducing member engaging the gate members and urging them toward each other at least when the gate assembly is not in the closed position. In various example embodiments, the at least one lateral-force-inducing member may further comprise: (e) at least one spring engaging both the gate members, such as a snap ring. In other embodiments, the at least one lateral-force-inducing member may further comprise any or all of the following elements: (e) a first cam follower attached to the first gate member and oriented to travel against a first surface fixed inside the valve chamber, the profile of the first surface causing the first gate member to move toward the second gate member when the gate assembly is moved away from the closed position; (f) a second cam follower attached to the first gate member and oriented to travel against the first surface fixed inside the valve chamber, the profile of the first surface causing the first gate member to move toward the second gate member when the gate assembly is moved away from the closed position; (g) the first and second cam followers being attached to one side of the first gate member, and corresponding third and fourth cam followers being attached to an opposing side of the first gate member, the third and fourth cam followers oriented to travel against a second surface fixed inside the valve chamber, the profile of the second surface causing the first gate member to move toward the second gate member when the gate assembly is moved away from the closed position; (h) a fifth cam follower attached to the second gate member and oriented to travel against a third surface fixed inside the valve chamber, the profile of the third surface causing the second gate member to move toward the first gate member when the gate assembly is moved away from the closed position; (i) a sixth cam follower attached to the second gate member and oriented to travel against the third surface fixed inside the valve chamber, the profile of the third surface causing the second gate member to move toward the first gate member when the gate assembly is moved away from the closed position; (j) the fifth and sixth cam followers being attached to one side of the second gate member, and corresponding seventh and eighth cam followers being attached to an opposing side of the second gate member, the seventh and eighth cam followers oriented to travel against a fourth surface fixed inside the valve chamber, the profile of the fourth surface causing the second gate member to move toward the first gate member when the gate assembly is moved away from the closed position. In still other embodiments, the at least one lateral-force-inducing member may further comprise: (e) a plurality of cam followers attached to interior surfaces of the valve chamber, each cam follower oriented to travel against one of a plurality of follower-engaging surfaces fixed to opposing sides of both the first and second gate members, the profiles of the follower-engaging surfaces causing the first and second gate members to move toward each other when the gate assembly is moved away from the closed position. In various embodiments the lower wedge may be attached to a bottom interior surface of the valve body.

In another example embodiment, provided is an expanding gate valve, comprising: (a) a valve body having a valve chamber and inlet and outlet passages and having spaced interior sealing surfaces; (b) a gate assembly comprising first and second gate members each having a blocking portion longitudinally separated from a pass-through portion, the gate members being movable within the valve chamber to an open position permitting flow of fluid through the inlet passage, through the pass-through portions, and through the outlet passage, and a closed position with the blocking portion of the gate members located between the sealing surfaces and blocking the flow of fluid through the inlet and outlet passages, the gate members each defining an outer-facing surface facing in the direction of a corresponding interior sealing surface of the valve body, and an inner-facing surface facing the other gate member, the inner-facing surface of each gate member further defining first and second upper inclined cam surfaces and first and second lower inclined cam surfaces, the upper inclined cam surfaces symmetrical with the lower inclined cam surfaces about latitudinal axes, the upper and lower inclined cam surfaces of the first gate member being symmetrical with the upper and lower inclined cam surfaces of the second gate member about a longitudinal axis, the first upper and lower inclined cam surfaces disposed for engagement with opposed upper and lower closing wedges, respectively, the second upper and lower inclined cam surfaces disposed for engagement with opposed upper and lower opening wedges, respectively, and causing lateral expansion of said gate assembly responsive to engagement of the wedges with the corresponding inclined cam surfaces; (c) a valve stem having driving connection with the upper closing wedge and the lower opening wedge and the gate assembly for moving the gate assembly linearly to said open and closed positions; and (d) at least one lateral-force-inducing member engaging the gate members and urging them toward each other at least when the gate assembly is not in the closed or open position. In various example embodiments of this aspect, the at least one lateral-force-inducing member may further comprise: (e) at least one spring engaging both the gate members, such as a snap ring. In other embodiments, the at least one lateral-force-inducing member may further comprise: (e) a plurality of cam followers attached to opposing sides of both the first and second gate members, each cam follower oriented to travel against one of a plurality of follower-engaging surfaces fixed to interior surfaces of the valve chamber, the profiles of the follower-engaging surfaces causing the first and second gate members to move toward each other when the gate assembly is moved away from the closed position. In still other embodiments, the at least one lateral-force-inducing member may further comprise: (e) a plurality of cam followers attached to interior surfaces of the valve chamber, each cam follower oriented to travel against one of a plurality of follower-engaging surfaces fixed to opposing sides of both the first and second gate members, the profiles of the follower-engaging surfaces causing the first and second gate members to move toward each other when the gate assembly is moved away from the closed position. In various embodiments of this aspect the lower closing wedge may be attached to a bottom interior surface of the valve chamber, and the upper opening wedge may be attached to a top interior surface of the valve chamber.

Further details regarding example embodiments of the invention are provided below with reference to the accompanying example figures. Additional aspects, alternatives and variations as would be apparent to persons of skill in the art are also disclosed herein and are specifically contemplated as included as part of the invention, which is limited not by any example but only by the claims.

BRIEF DESCRIPTION OF THE DRAWINGS

The following figures illustrate certain aspects of the design and utility of example embodiments of the invention.

FIG. 5A-1 is a partial cutaway side view of portion A of the example full body gate valve of FIG. 5, shown in the fully open position.

FIG. 5A-2 is a partial cutaway side view of a portion A of the example full body gate valve of FIG. 5, shown during movement between the fully opened and fully closed positions.

FIG. 5A-3 is a partial cutaway side view of a portion A of the example full body gate valve of FIG. 5, shown in the fully closed position.

DETAILED DESCRIPTION OF EXAMPLE EMBODIMENTS

Figure 1:
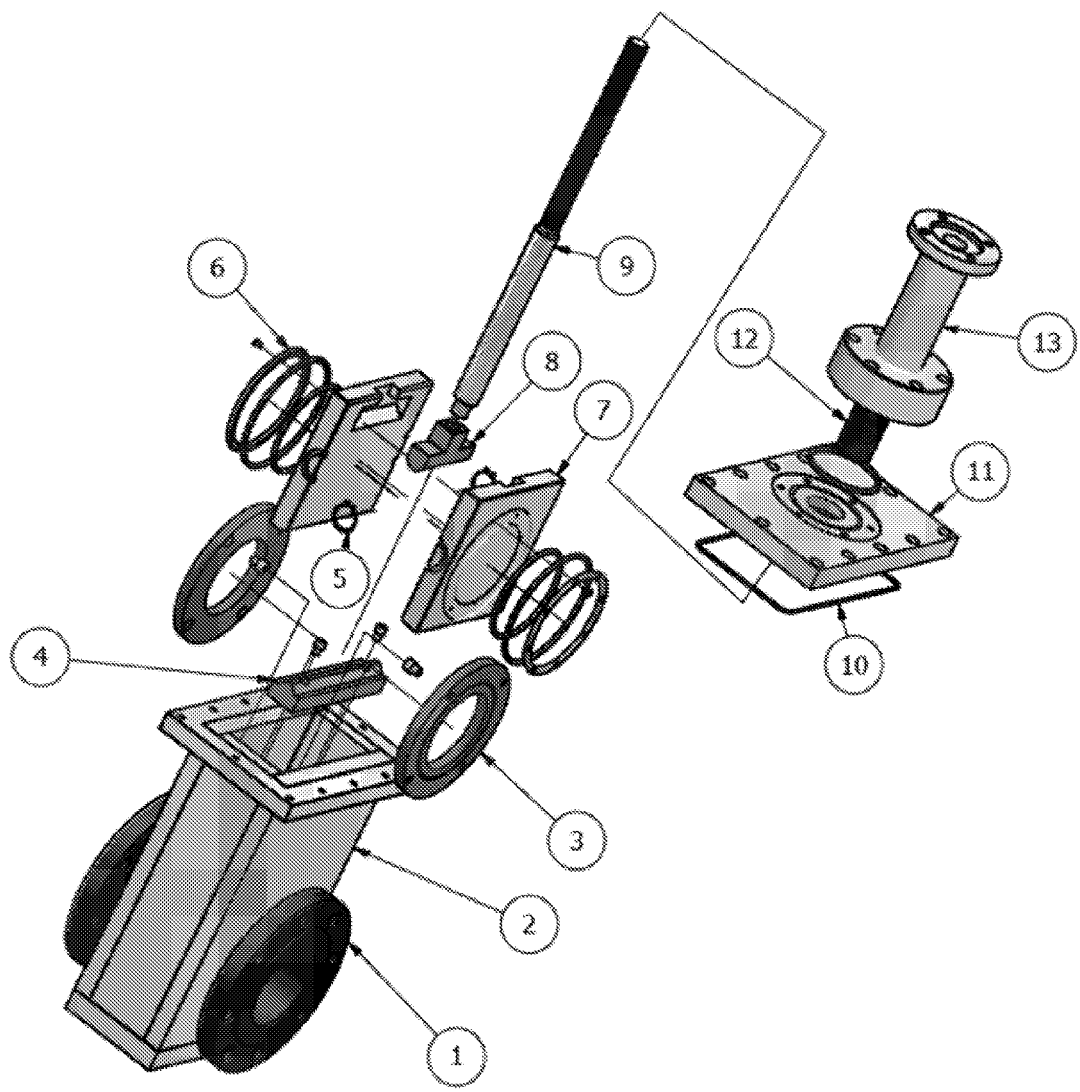
FIG. 1 is an exploded perspective view of certain components of an example compact gate valve according to certain embodiments of the invention.

Reference is made herein to some specific examples of the present invention, including any best modes contemplated by the inventor for carrying out the invention. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, certain specific details are set forth in order to provide a thorough understanding of the present invention. Particular example embodiments of the present invention may be implemented without some or all of these specific details. In other instances, device features well known to persons of skill in the art have not been described in detail in order to not obscure unnecessarily the present invention. The invention is scalable, and is not limited to any particular size range.

Example aspects, components and features of various embodiments of the present gate valve are illustrated in FIGS. 1 through 9 and are described below. Example components of one embodiment of this new expanding gate valve are shown in FIGS. 1 through 4, where standard neck flanges 1 define inlet/outlet passageways 1.1, 1.2 there through, are adapted to attach to existing pipelines, and are welded or otherwise attached to opposing exterior sides of valve body 2, thereby defining inlet and outlet passages 1.1, 1.2 into and out of the valve body 2. The valve body 2 defines an interior that houses a variety of components 3 through 9, which are capped by a bonnet 11 which is sealed to the top of the valve body 2, for instance with a gasket or molded shape 10. The internal components may include seal face plates 3 adapted to attach to and seal against the interior surface of the valve body 2 around the inlet and outlet passages 1.1, 1.2 defined by neck flanges 1. Seal face plates 3 may comprise rubber or other polymer compound molded into one or more grooves cut into surfaces on one or both sides of the seal face plate 3. For instance, a molded-in and compression-controlled seal design like a Gask-O-Seal available from Parker Hannifin Corporation and its competitors may be used. An upward-facing bottom wedge 4 may be attached to a bottom interior surface of the valve body 2. Threads on valve stem 9 engage mating threads in yoke tube 13 that is affixed to bonnet 11 and sealed therewith using one or more seals 12. A driving mechanism (not shown) such as a hand wheel or automated driving system rotates valve stem 9 in first and second directions and thereby drives it up and down relative to the valve body 2. Opposing, substantially symmetrical gate members 7 translate up and down inside the interior of valve body 2 at the urging of valve stem 9 driving an upper wedge 8 with symmetrical wedged surfaces 8.2 that engage interior-facing symmetrical surfaces 7.2 of the gate members 7. As used in this document, the term "symmetrical" is not necessarily limited to exact mirror-images, but rather means that if there are angled or cam surfaces that are symmetrical about a line of symmetry, then the angled and/or cam surfaces would face the same direction if folded about that line of symmetry.

Figure 2:
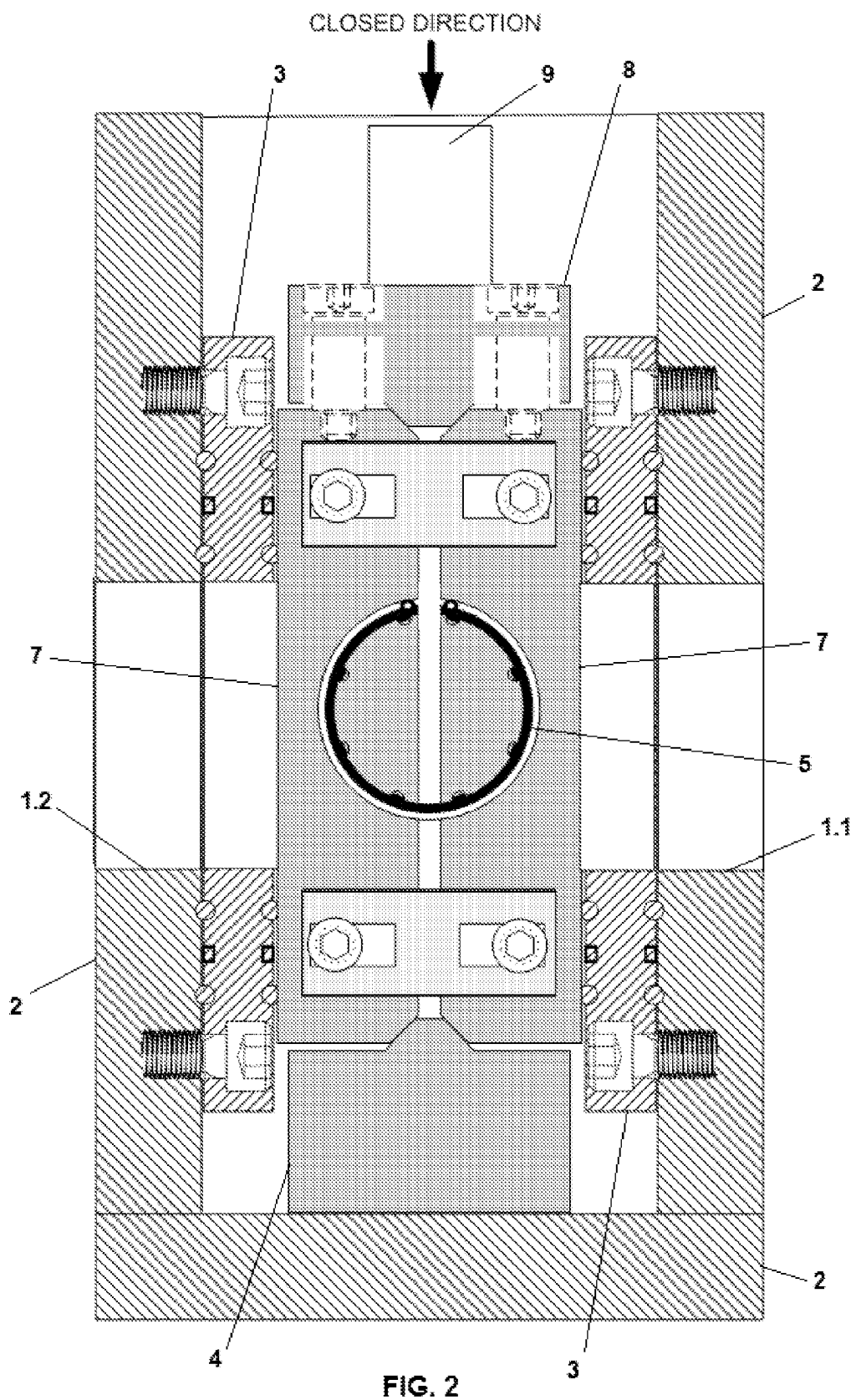
FIG. 2 is a partial sectional side elevation view of an example compact gate valve according to certain embodiments of the invention in the fully closed position.

As depicted in FIG. 2, translating the gate members 7 to the lower portion of the interior of the valve body 2 (away from the bonnet 11) by rotating the valve stem 9 in a first direction causes lateral expansion of the gate members 7 away from each other when interior-facing symmetrical-inclined cam surfaces 7.1 near the bottom of the gate members 7 engage symmetrical wedged surfaces 4.1 of upward-facing bottom wedge 4, while simultaneously, interior-facing symmetrical-inclined cam surfaces 7.2 near the top of gate members 7 engage downward-facing symmetrical wedged surfaces 8.2 of upper wedge 8. As shown in FIG. 2, this locates the gate members 7 in blocking position over the inlet and outlet passages 1.1, 1.2 and places seals 6 in sealing contact with seal face plates 3, thereby closing the valve and sealing both the inlet and outlet passages 1.1, 1.2 bubble-tight, allowing double-block and bleed procedures as previously described. Seals 6 may comprise any suitable sealing structure, such as one or more elastomeric seals and retainers, as shown. Alternatively, seals 6 may comprise additional seal face plates 3 (not shown) that are attached to the gates 7, for instance at least partially inside counterbores (not shown) in the outward facing sides of the gate members 7, with elastomeric sealing material molded or otherwise attached to the face of the additional seal face plates 3.

Figure 3:
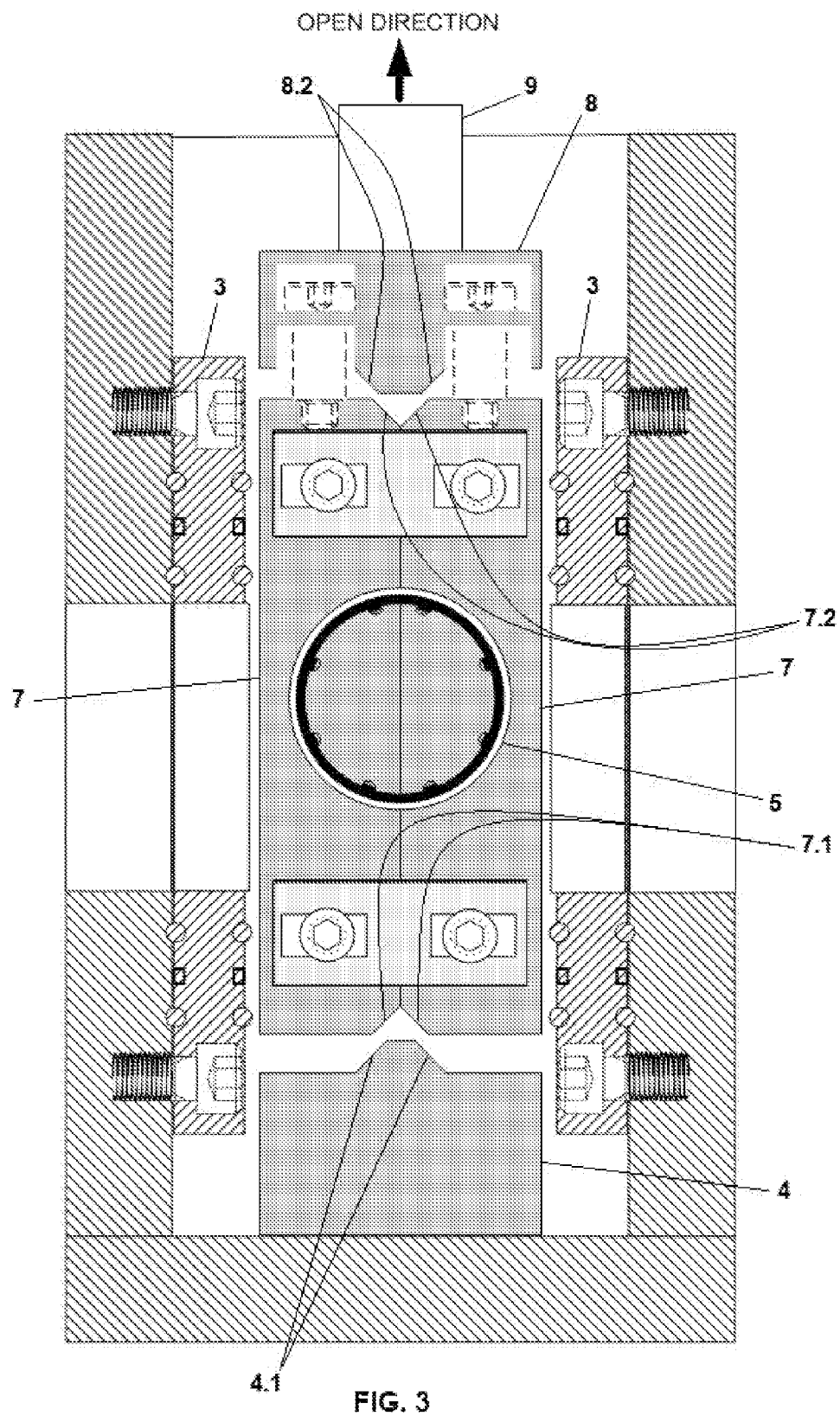
FIG. 3 is a partial sectional side elevation view of the example compact gate valve of FIG. 2 shown during movement between the fully closed and fully opened positions.
Figure 4:
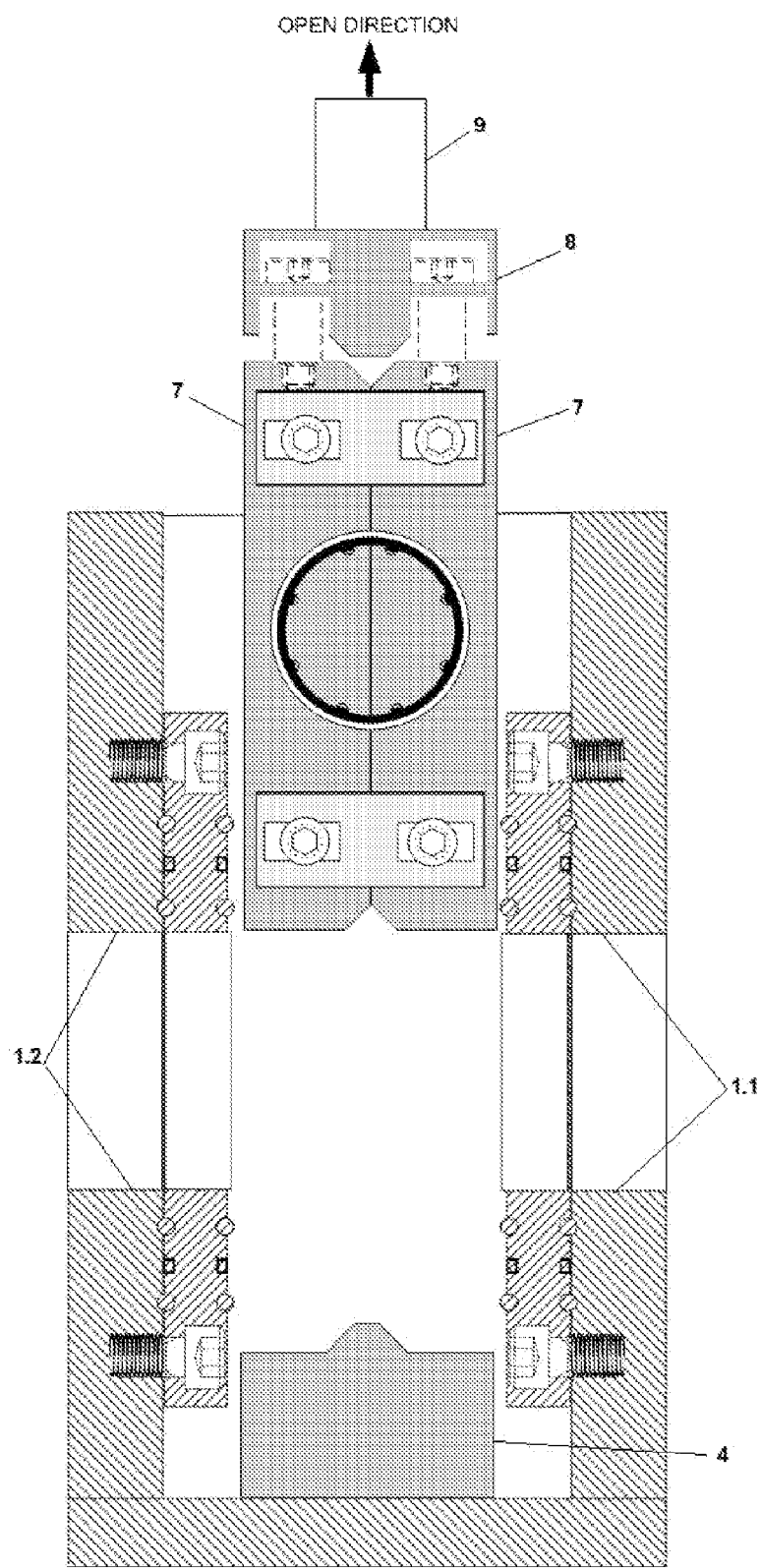
FIG. 4 is a partial sectional side elevation view of the example compact gate valve of FIG. 2 shown during in the fully opened position.

To open the valve, valve stem 9 is rotated in a second direction, thereby driving gate members 7 toward the upper portion of the interior of the valve body 2 (toward bonnet 11) as depicted in FIGS. 3 and 4. Driving gate members 7 toward the upper portion of the interior of the valve body 2 disengages seals 6 from the seal face plates 3 by retracting the gate members 7 back toward each other. This occurs when the interior-facing symmetrical-inclined cam surfaces 7.1 near the bottom of the gate members 7 disengage symmetrical wedged surfaces 4.1 of upward-facing bottom wedge 4, while simultaneously, the interior-facing symmetrical-inclined cam surfaces 7.2 near the top of gate members 7 disengage downward-facing symmetrical wedged surfaces 8.2 of upper wedge 8. Lateral retraction of the gate members 7 toward each other is then assisted by at least one lateral-force-inducing member engaging the gate members 7 and urging them toward each other. For example, in the embodiment shown in FIGS. 1-4, snap rings 5 encircle and engage mating surfaces on opposite sides of both gate members 7, such that lateral expansion of the gate assembly 5, 6, 7 expands snap rings 5 as shown in FIG. 2, which then apply a restorative laterally-retracting force against gate members 7, moving gate members 7 back toward each other when the gate members 7 are translated away from the closed position, as shown in FIGS. 3 and 4. Once the gate assembly 5, 6, 7 is translated out of the way of the inlet and outlet passages 1.1, 1.2 as shown in FIG. 4, the valve is open and flows freely. The embodiments shown in FIGS. 1-4 are compact or "short body" gate valves, where the gate members 7 are non-ported.

Figure 5:
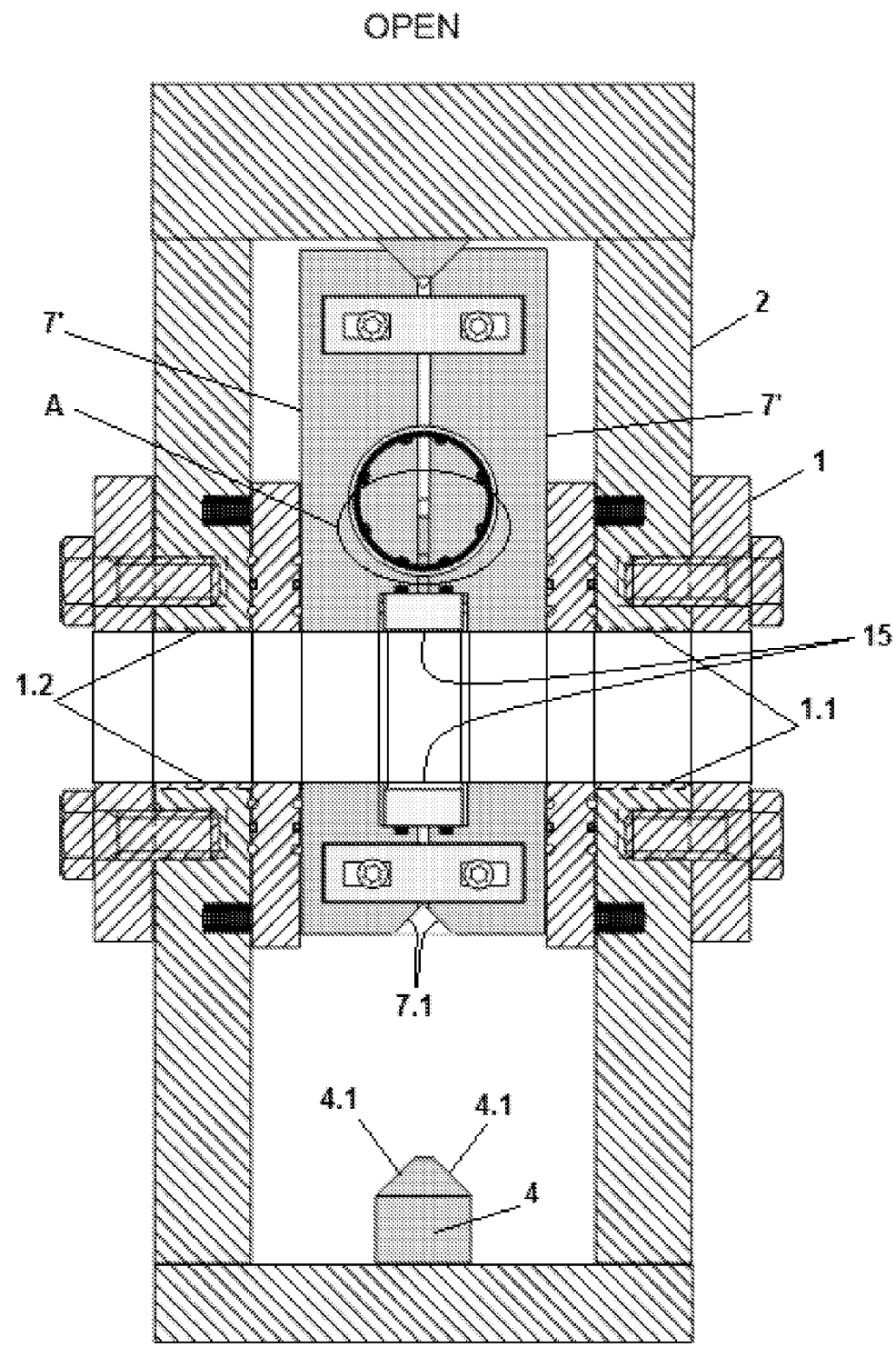
FIG. 5 is a partial sectional side elevation view of an example full body gate valve according to certain embodiments of the invention in the fully opened position.
Figures 1, 5A:
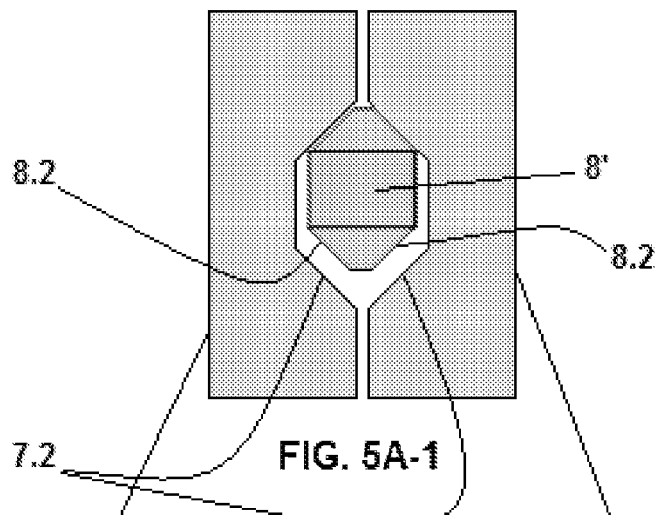
Figures 2, 5A:
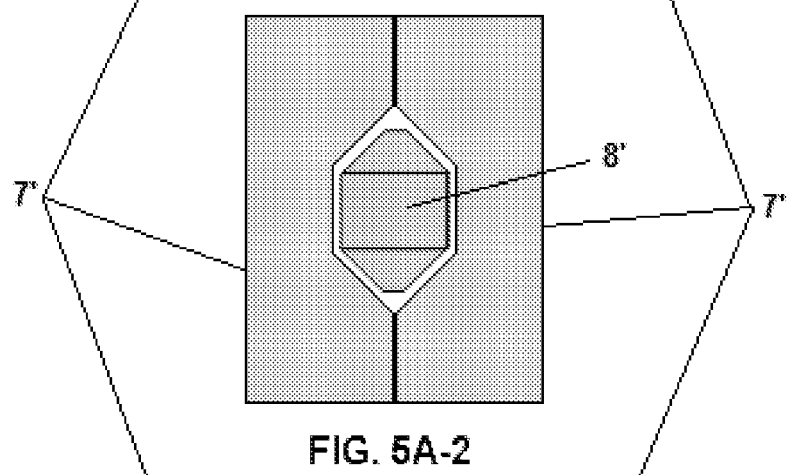
Figures 3, 5A:
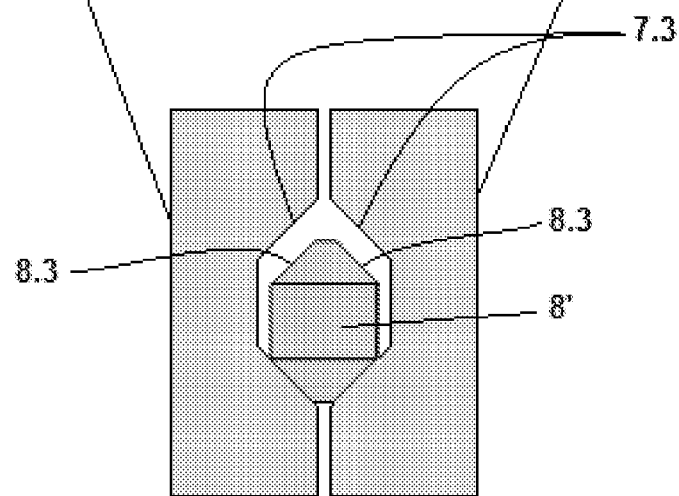

Alternatively, the present invention can be applied to a "full body" gate valve design, where the gate members 7 define a flow port that is aligned with the inlet and outlet passages 1.1, 1.2 when the valve is in the open position. For instance, with reference to FIGS. 5-7, elongated gate members 7' may be provided with a through port that aligns with the inlet and outlet passages 1.1, 1.2 when the valve is the open position as shown in FIG. 5. In this embodiment, the valve seals in the shut position as in FIGS. 1-4, by translating the gate members 7' to the lower portion of the interior of the valve body 2 by rotating the valve stem 9 in a first direction and causing lateral expansion of the gate members 7' away from each other when interior-facing symmetrical-inclined cam surfaces 7.1 near the bottom of the gate members 7' engage symmetrical wedged surfaces 4.1 of upward-facing bottom wedge 4 as shown in FIGS. 5 and 7, while simultaneously, interior-facing symmetrical-inclined cam surfaces 7.2 near the top of gate members 7' engage downward-facing symmetrical wedged surfaces 8.2 of upper wedge 8', as depicted in FIG. 5A-3. But unlike the compact or "short body" embodiment shown in FIGS. 1-4, the "full body" gate valve shown in FIGS. 5-7 also seals when the valve is all the way open as shown in FIG. 5. Specifically, the valve seals in the open position as in FIGS. 5-7, by translating the gate members 7' to the upper portion of the interior of the valve body 2 by rotating the valve stem 9 in a second direction and causing lateral expansion of the gate members 7' away from each other when interior-facing symmetrical-inclined cam surfaces 7.4 near the top of the gate members 7' engage symmetrical wedged surfaces 14.4 of downward-facing top wedge 14 as shown in FIGS. 6 and 7, while simultaneously, interior-facing symmetrical-inclined cam surfaces 7.3 near the top of gate members 7' (but below cam surfaces 7.4) engage upward-facing symmetrical wedged surfaces 8.3 of upper wedge 8', as depicted in FIG. 5A-1.

Figure 6:
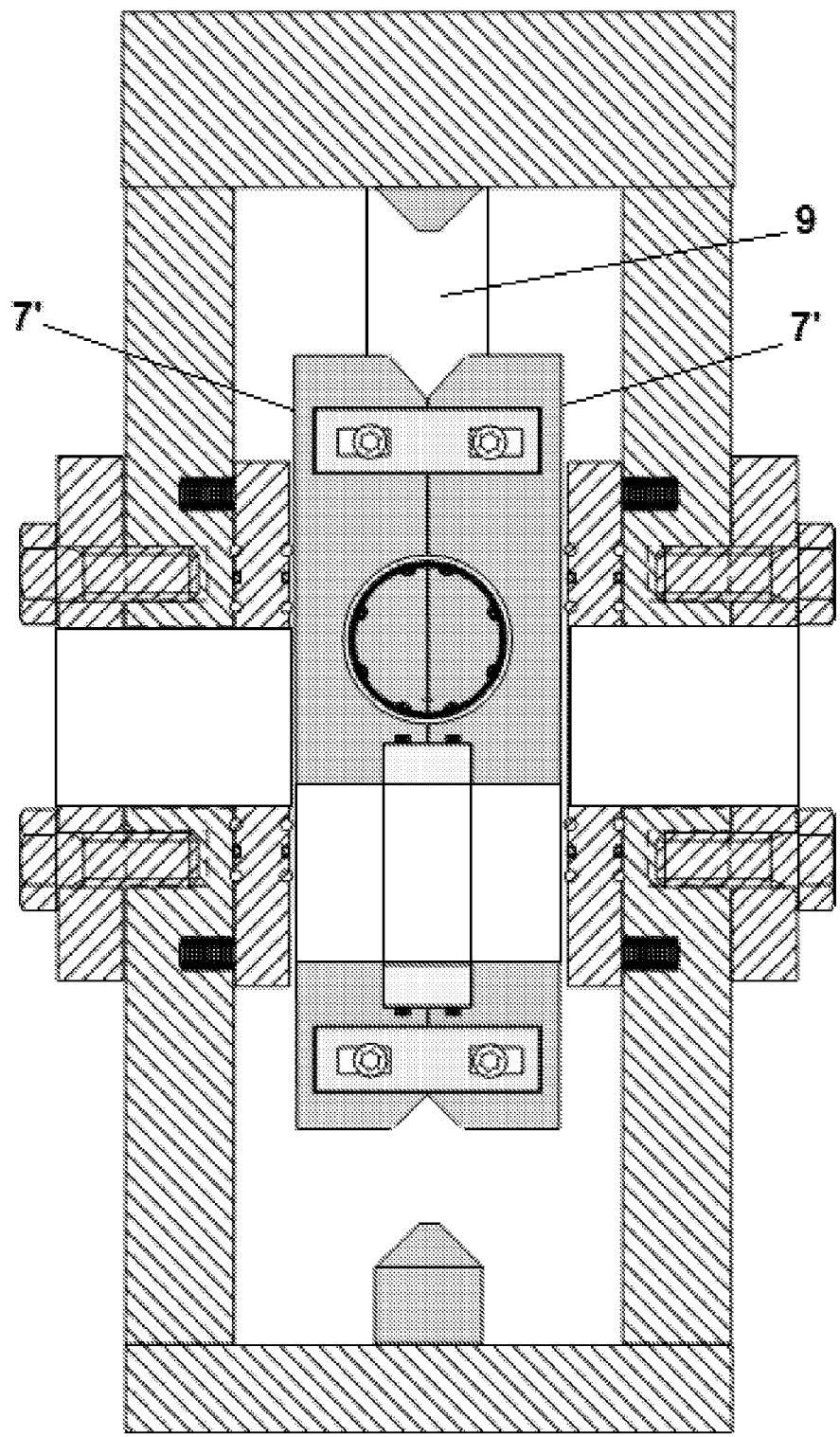
FIG. 6 is a partial sectional side elevation view of the example full body gate valve of FIG. 5 shown during movement between the fully opened and fully closed positions.
Figure 7:
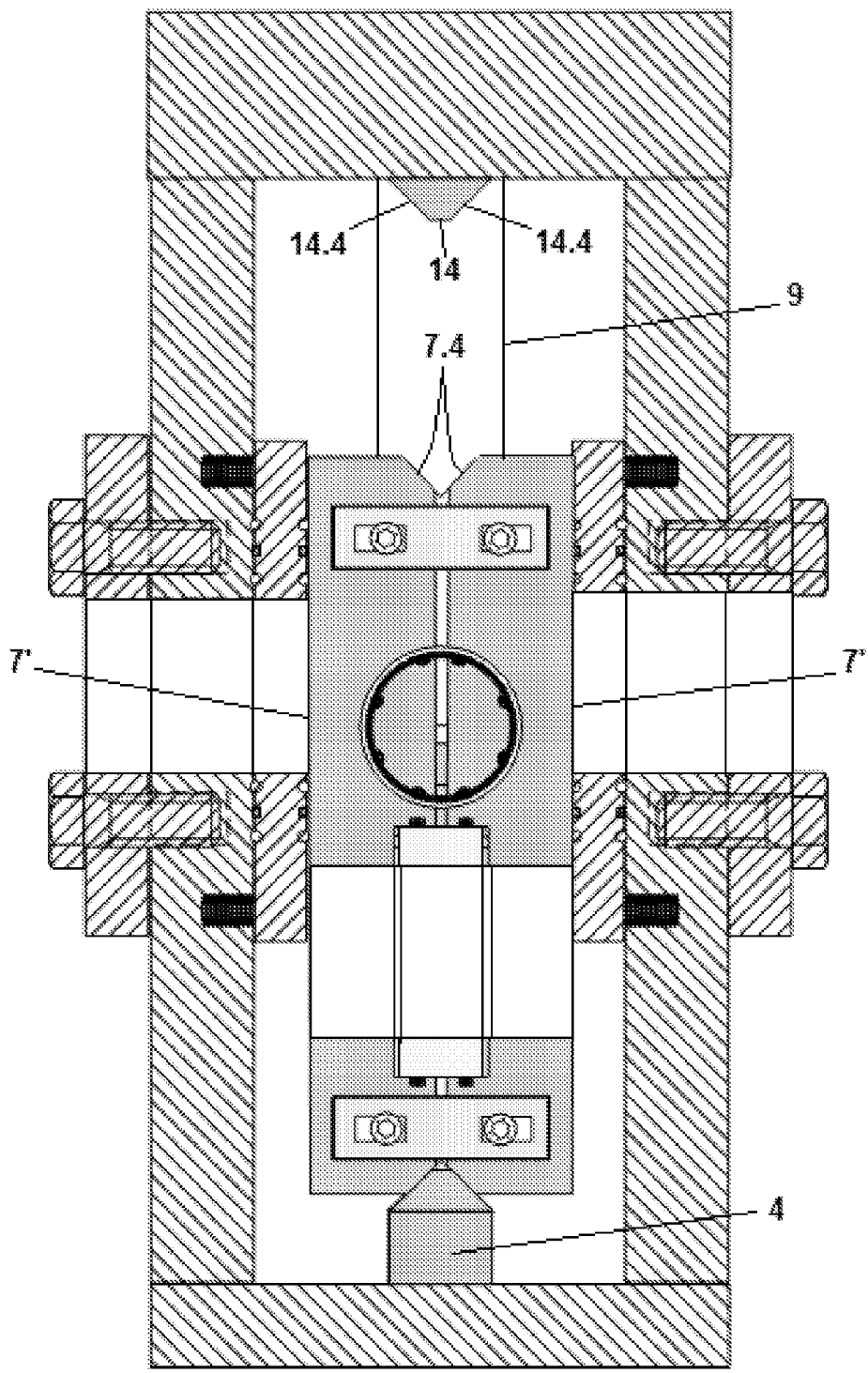
FIG. 7 is a partial sectional side elevation view of the example full body gate valve of FIG. 5 in the fully closed position.

An additional new feature is shown in FIGS. 5-7, namely the sealed sleeve 15. The sealed sleeve 15 can be used with any of the foregoing embodiments, and allows the gate members 7 or 7' to move laterally with respect to each other while also sealing the interior of the valve body 2 from pressure in the pipeline when the valve is open, for instance as shown in FIG. 5. The sealed sleeve 15 in the embodiment in FIGS. 5-7 comprises an annulus having an inner diameter approximately the same as the inner diameter of the pipeline and/or the inlet and outlet passages 1.1, 1.2. The sealed sleeve 15 further comprises a plurality of O-rings or other sealing members encircling the outer diameter of the annulus, one mating against an appropriately-sized counterbore in the first gate member 7', and the other mating against an appropriately-sized counterbore in the second gate member 7'. This feature can advantageously prevents fluid and pressure buildup in the interior of the valve body 3, which will tend to prevent leaks and other maintenance problems.

FIG. 6 depicts this system of FIGS. 5-7 with gate members 7' retracted toward each other during movement between the open and shut positions of FIGS. 5 and 7, respectively. Similar to the embodiments shown in FIGS. 1-4, when the cam surfaces 7.1, 7.2, 7.3, 7.4 of gate members 7' are retracted from their corresponding wedge surfaces 4.1, 8.2, 8.3, 14.4, the gate members 7' disengage seals 6 from the seal face plates 3 by the gate members 7' retracting back toward each other. Lateral retraction of the gate members 7 toward each other is then assisted by at least one lateral-force-inducing member engaging the gate members 7' and urging them toward each other. Like the embodiments shown in FIGS. 1-4, in the embodiment shown in FIGS. 5-7, snap rings 5 encircle and engage mating surfaces on opposite sides of both gate members 7', such that lateral expansion of the gate assembly 5, 6, 7' expands snap rings 5 as shown in FIGS. 5 and 7, which then apply a restorative laterally-retracting force against gate members 7', moving gate members 7' back toward each other when the gate members 7' are translated away from the open or closed positions, as shown in FIGS. 6 and 5A-2.

Figure 8:
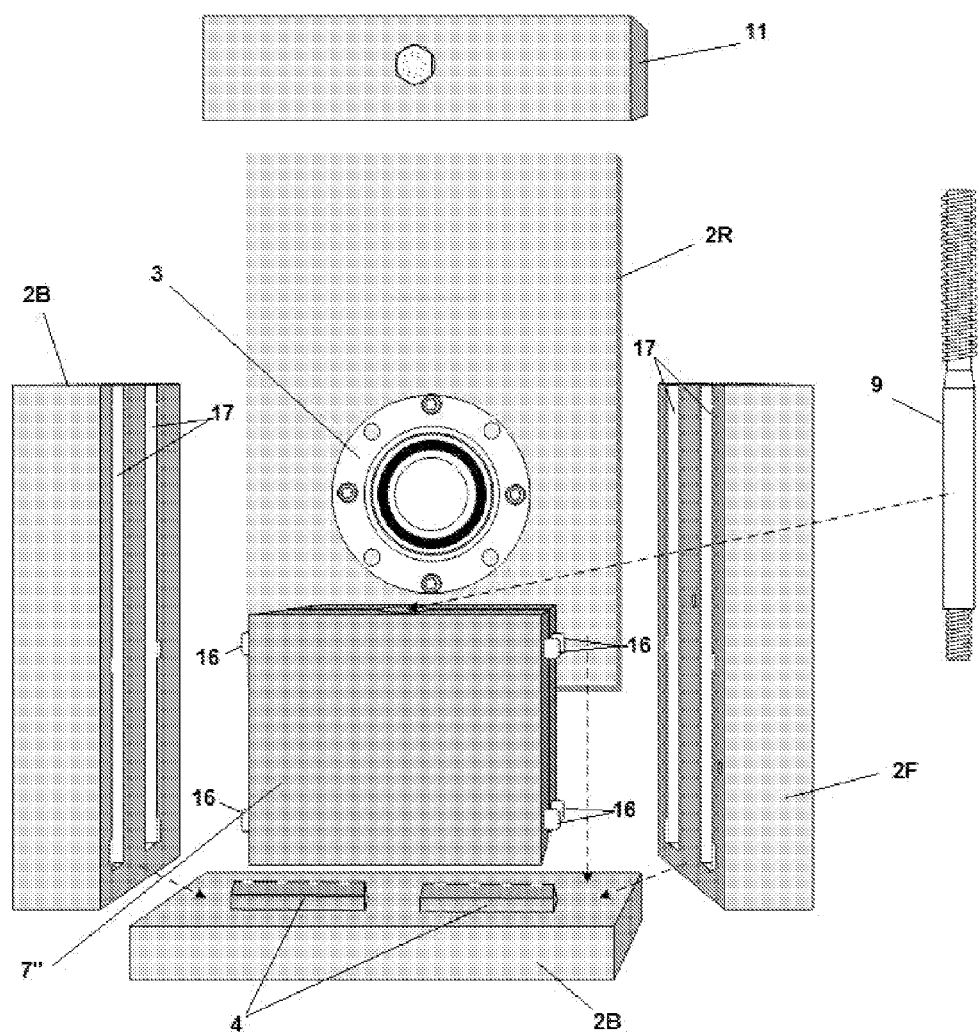
FIG. 8 is an exploded perspective view of certain components of an example gate valve according to certain embodiments of the invention, showing cam followers attached with and extending outward from the sides of the gate members, which cam followers are adapted and positioned to follow the contours of corresponding surfaces shown as grooves in the interior sides of the valve body.
Figure 9:
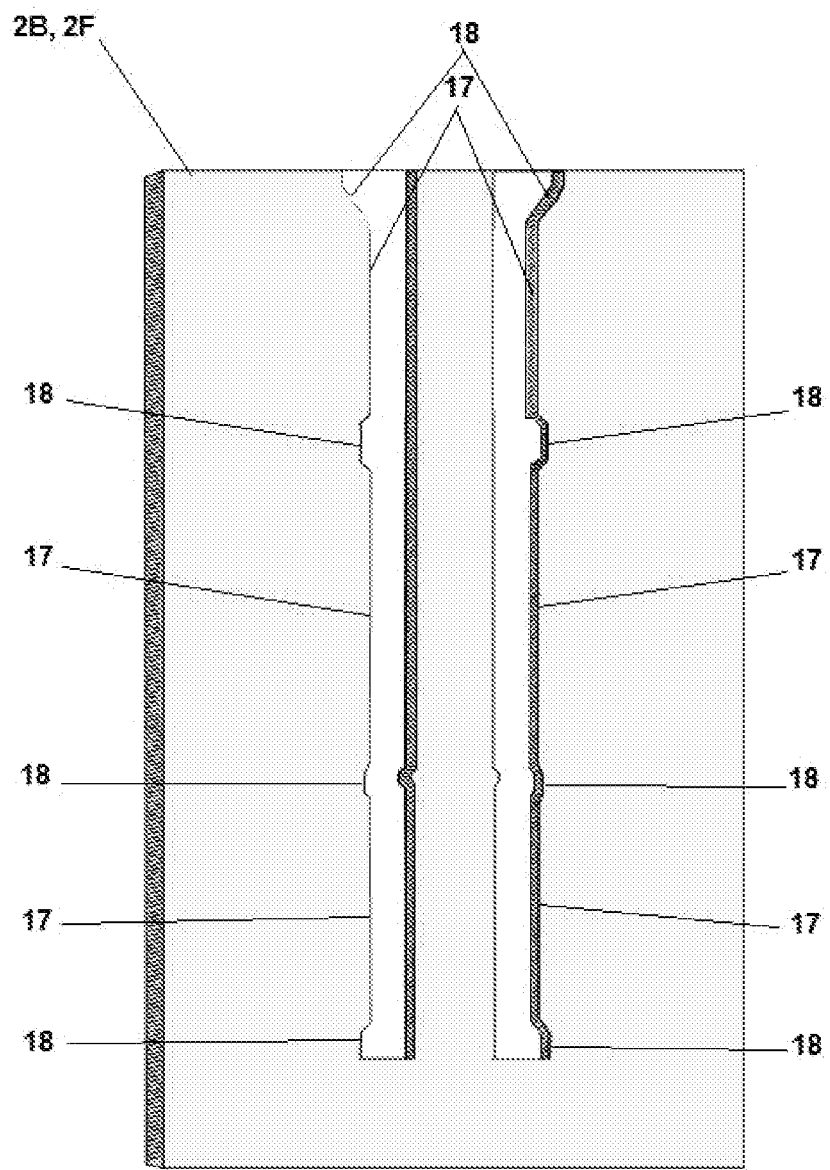
FIG. 9 is a side perspective view of an interior side of the valve body shown in FIG. 8, showing the contours of the mating surfaces for the cam followers.

Lateral-force-inducing members that help the gate members 7, 7' to move toward each other may comprise any suitable force inducing means. In the example embodiments shown in FIGS. 1-7, springs are shown, in that example one or snap-rings being stretched open. Another example of lateral-force-inducing members may comprise cam followers running against surfaces that define the gate members' movement profile. For instance, as shown in FIGS. 8-9, gate members 7" may each be provided with one or more cam followers 16 adapted and oriented to travel against a corresponding surface 17, 18 formed in or attached with the interior of the valve body 2. A cam follower 16, also known as a track follower, is a specialized type of cantilevered roller or needle bearing designed to follow contoured surfaces. For example, Cylindrical Roller Cam Followers from RBC Bearings Incorporated may be used. In the exploded view in FIG. 8, shown are the front and back sides of the valve body 2, labeled 2F and 2B respectively. Also shown is the base 2B of the valve body 2 (to which a plurality of lower wedges 4 are attached), as well as the right side 2R of the valve body 2, and the bonnet 11. Surfaces 17 are shown in this example cut into the front and back sides of the valve body, 2F, 2B. Alternatively, the surfaces 17, 18 could be provided on one or more other members attached with the interior of the valve body 2. In this example two cam followers 16, an upper cam follower 16 and a lower cam follower 16, are provided on opposing sides of each gate member 7". This feature may be used with the compact or fully body valves described herein. In either case, the profiles of surfaces 17, 18 cause the gate members 7"

engaged with the surfaces 17, 18 via the cam followers 16 to move along the profile defined by the surfaces 17, 18. For example, as shown in FIG. 9, the surfaces may include straight surfaces 17 blending into pockets or detents 18 that allow the gate members 7″ space to move laterally away from each other and seal against the sealing plates 3 when the gate assembly 6, 7″ is moved longitudinally into a fully closed and/or fully open position and the cam followers 16 roll from the straight surfaces 17 into the pockets or detents 18. When the gate members 7″ are initially longitudinally translated away from a fully closed and/or fully opened position, the cam followers 16 roll out of a pocket or detent 18 onto a straight surface 17 and thereby forcibly but smoothly and precisely steer the cam followers 16 to laterally translate the gate members 7″ toward each other and away from the interior surfaces of the valve body 2 and away from the seal plates 3, thereby preventing sliding against and galling or otherwise deteriorating the surface of the sealing material. By forcing the gate members 7″ to translate laterally toward each other and away from the interior of the valve body 2 by a precise amount at a precise location, the cam followers 16 can be used in this system as accurate and reliable lateral-force-inducing members. Additionally, the locations of the cam followers 16 and their mating surfaces 17, 18 may be reversed as to some or all of the cam followers. For instance, the cam followers may alternatively be attached with the interior of the valve body 2, while the mating surfaces 17, 18 may be provided on or attached with the gate members 7″. In other less preferable embodiments, steel dowel pins or any other functional means could be used in place of cam followers 16.

Specific example components that can be used with the example embodiment shown in FIG. 1 will now be described. For instance, flanges 1 may comprise standard weld forged steel neck flanges available from Reel Pipe, Inc. Valve body 2 may be formed from any suitable material using any suitable process, such as cast iron, cast steel, welded or fastened steel plates or tubing in any suitable shape, including stainless steel plates or tubing. For instance, in certain embodiments valve body 2 may be formed from ¾″ thick A-36 hot rolled steel, which is available from Alro Steel, Inc. Seal Face plates 3 may be may be formed from any suitable material using any suitable process, such as cast iron, cast steel, or steel plates including stainless steel plates. For instance, in certain embodiments seal plates 3 may be formed from ½″ thick A-36 hot rolled steel rounds having a 5¾″ outer diameter, which are available from Alro Steel, Inc. Lower wedge block 4 may be formed from any suitable material including any of the above materials, such as by machining upward-pointing wedge surfaces into 1″ by 1″ A-36 hot rolled steel, which is available from Alro Steel, Inc. A snap ring 5 suitable for certain embodiments is ¹⁄₁₆″ thick by 1½″ outer diameter, which is available from Fastenal. Seals 6 can in certain embodiments comprise four gate seal O-rings, such as Viton #334 and #345 available from Parker Hannifin Corporation, and a retainer plate, such as a 5″ outer diameter carbon steel plate cut from bar stock available from Alro Steel, Inc. Gate members 7 may be may be formed from any suitable material using any suitable process, such as cast iron, cast steel, or steel plates including stainless steel plates. For instance, in certain embodiments gate members 7 may be may be formed from ¾″ thick 6″ by 6″ A-36 hot rolled steel plates from Alro Steel, Inc., that may be electroless nickel plated by K&I Hardchrome, Inc. Upper wedge block 8 may be may be formed from any suitable material using any suitable process, such as cast iron, cast steel, or steel plates including stainless steel stock. For instance, in certain embodiments wedge block 8 may be may be formed from 1″ by 3.5″ A-36 hot rolled steel bar stock, which is available from Alro Steel, Inc. Valve stem 9 may be formed from any suitable material including any of the above materials, for instance 1⅛″ outer diameter 17-4 stainless steel round that is 14½″ long, also available from Alro Steel, Inc. The bonnet 11 may be formed from any suitable material including any of the above materials, for instance an 8″×5¼″ A-36 hot rolled steel plate that is 1½″ thick, available from Alro Steel, Inc. Bonnet sealing member 10 may comprise a paper gasket, liquid sealant, molded shape, or a properly-sized O-ring, such as 0.210″ thick O-ring formed from #392 Viton fluorocarbon, which is available from Parker Hannifin Corporation. Bonnet 11 may be attached to valve body 2 by any suitable means, for instance by ⅝-11 Grade 8 bolts (not shown) screwed into holes tapped into the valve body 2. Yoke tube 13 may be fabricated from any suitable materials like the valve body 2 or bonnet 11, for instance from 4″ outer diameter carbon steel bar stock and 2″ outer diameter heavy wall pipe, both of which are available from Alro Steel, Inc. The yoke tube 13 may be sealed to the bonnet 11 with any suitable seal(s), such as eight Chevron Vee packings, for instance fabric-reinforced Viton Chevron Vee packings that are 1¾″ outer diameter by 1⅛″ inner diameter and ¼″ thick, which are available from Power Supply, Inc. The foregoing details relate to just one example embodiment, and do not limit the invention.

Due to the uniquely efficient and robust design discovered by the present inventor, gate valves built and used according to the present disclosure can easily be made exactly the same size as regular (non-expanding) gate valves and thus fit into existing pipelines as a direct replacement for regular gate valves. The present gate valves also apply consistent force across the face of the seal, which helps prevent leaks and binding. The present gate valves seal against pressure equally well in one direction as the other, given their symmetrical design. The present gate valves minimize dragging of the gate members across the face of seal during engagement and/or disengagement, which protects the seal and avoids leaks. In view of their robust symmetrical design, the present gate valves require only a small force to actuate, requiring smaller and less expensive actuators. They also do not tend to get "stuck" in place once actuated. The present full body gate valves expand and seal in both the open and closed positions, allowing full double-block-and-bleed functionality. The present compact body gate valves expand and seal in the closed position, allowing full double-block-and-bleed functionality when closed. The present full body gate valves provide a consistent inner surface with the pipeline, which avoids pressure drops and does not interfere with cleaning "pigs" that are run through the lines. Furthermore, the present gate valves are simple and inexpensive to manufacture and maintain, require no special tools to service; and operate smoothly and reliably.

The above devices, structures, methods, and functionalities are set forth to illustrate general concepts. Numerous other devices, structures, methods, and functionalities, and combinations and permutations thereof, are contemplated, and are inherently and necessarily disclosed to persons of ordinary skill in the art by the description and drawings herein.

Although exemplary embodiments and applications of the invention have been described herein including as described above and shown in the included example drawings, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that is allowed by the patent office based on this or any related patent application.

I claim:
1. An expanding gate valve, comprising:
   (a) a valve body having a valve chamber and inlet and outlet passages and having spaced interior sealing surfaces;
   (b) a gate assembly comprising first and second gate members and being movable within the valve chamber to an open position permitting flow of fluid through the inlet and outlet passages and a closed position with the gate assembly located between the sealing surfaces and blocking the flow of fluid through the inlet and outlet passages, the gate members each defining an outer-facing surface facing in the direction of a corresponding interior sealing surface of the valve body, and an inner-facing surface facing the other gate member, the inner-facing surface of each gate member further defining an upper inclined cam surface and a lower inclined cam surface, the upper inclined cam surface symmetrical with the lower inclined cam surface about a latitudinal axis, the upper and lower inclined cam surfaces of the first gate member being symmetrical with the upper and lower inclined cam surfaces of the second gate member about a longitudinal axis, the upper and lower inclined cam surfaces disposed for engagement with opposed upper and lower wedges, respectively, and causing lateral expansion of said gate assembly responsive to engagement of the upper and lower wedges with the upper and lower inclined cam surfaces;
   (c) a valve stem having driving connection with the upper wedge and the gate assembly for moving the gate assembly linearly to said open and closed positions; and
   (d) at least one lateral-force-inducing member engaging the gate members and urging them toward each other at least when the gate assembly is not in the closed position;
   wherein the at least one lateral-force-inducing member further comprises:
   (e) a first cam follower attached to the first gate member and oriented to travel against a first surface fixed inside the valve chamber, the profile of the first surface causing the first gate member to move toward the second gate member when the gate assembly is moved away from the closed position; and
   (f) a second cam follower attached to the first gate member and oriented to travel against the first surface fixed inside the valve chamber, the profile of the first surface causing the first gate member to move toward the second gate member when the gate assembly is moved away from the closed position.

2. The expanding gate valve of claim 1, wherein the at least one lateral-force-inducing member further comprises:
   (g) at least one spring engaging both the gate members.

3. The expanding gate valve of claim 2, wherein the spring comprises a snap ring.

4. The expanding gate valve of claim 1, wherein the at least one lateral-force-inducing member further comprises:
   (g) the first and second cam followers being attached to one side of the first gate member, and corresponding third and fourth cam followers being attached to an opposing side of the first gate member, the third and fourth cam followers oriented to travel against a second surface fixed inside the valve chamber, the profile of the second surface causing the first gate member to move toward the second gate member when the gate assembly is moved away from the closed position.

5. The expanding gate valve of claim 1, wherein the at least one lateral-force-inducing member further comprises:
   (g) a fifth cam follower attached to the second gate member and oriented to travel against a third surface fixed inside the valve chamber, the profile of the third surface causing the second gate member to move toward the first gate member when the gate assembly is moved away from the closed position.

6. The expanding gate valve of claim 5, wherein the at least one lateral-force-inducing member further comprises:
   (h) a sixth cam follower attached to the second gate member and oriented to travel against the third surface fixed inside the valve chamber, the profile of the third surface causing the second gate member to move toward the first gate member when the gate assembly is moved away from the closed position.

7. The expanding gate valve of claim 6, wherein the at least one lateral-force-inducing member further comprises:
   (i) the fifth and sixth cam followers being attached to one side of the second gate member, and corresponding seventh and eighth cam followers being attached to an opposing side of the second gate member, the seventh and eighth cam followers oriented to travel against a fourth surface fixed inside the valve chamber, the profile of the fourth surface causing the second gate member to move toward the first gate member when the gate assembly is moved away from the closed position.

8. The expanding gate valve of claim 1, wherein the lower wedge is attached to a bottom interior surface of the valve body.

9. An expanding gate valve, comprising:
   (a) a valve body having a valve chamber and inlet and outlet passages and having spaced interior sealing surfaces;
   (b) a gate assembly comprising first and second gate members and being movable within the valve chamber to an open position permitting flow of fluid through the inlet and outlet passages and a closed position with the gate assembly located between the sealing surfaces and blocking the flow of fluid through the inlet and outlet passages, the gate members each defining an outer-facing surface facing in the direction of a corresponding interior sealing surface of the valve body, and an inner-facing surface facing the other gate member, the inner-facing surface of each gate member further defining an upper inclined cam surface and a lower inclined cam surface, the upper inclined cam surface symmetrical with the lower inclined cam surface about a latitudinal axis, the upper and lower inclined cam surfaces of the first gate member being symmetrical with the upper and lower inclined cam surfaces of the second gate member about a longitudinal axis, the upper and lower inclined cam surfaces disposed for engagement with opposed upper and lower wedges, respectively, and causing lateral expansion of said gate assembly responsive to engagement of the upper and lower wedges with the upper and lower inclined cam surfaces;
   (c) a valve stem having driving connection with the upper wedge and the gate assembly for moving the gate assembly linearly to said open and closed positions; and
   (d) at least one lateral-force-inducing member engaging the gate members and urging them toward each other at least when the gate assembly is not in the closed position;
   wherein the at least one lateral-force-inducing member further comprises:

(e) a first cam follower attached to the first gate member and oriented to travel against a first surface fixed inside the valve chamber, the profile of the first surface causing the first gate member to move toward the second gate member when the gate assembly is moved away from the closed position;
(f) a second cam follower attached to the first gate member and oriented to travel against the first surface fixed inside the valve chamber, the profile of the first surface causing the first gate member to move toward the second gate member when the gate assembly is moved away from the closed position;
(g) the first and second cam followers being attached to one side of the first gate member, and corresponding third and fourth cam followers being attached to an opposing side of the first gate member, the third and fourth cam followers oriented to travel against a second surface fixed inside the valve chamber, the profile of the second surface causing the first gate member to move toward the second gate member when the gate assembly is moved away from the closed position;
(h) a fifth cam follower attached to the second gate member and oriented to travel against a third surface fixed inside the valve chamber, the profile of the third surface causing the second gate member to move toward the first gate member when the gate assembly is moved away from the closed position;
(i) a sixth cam follower attached to the second gate member and oriented to travel against the third surface fixed inside the valve chamber, the profile of the third surface causing the second gate member to move toward the first gate member when the gate assembly is moved away from the closed position;
(j) the fifth and sixth cam followers being attached to one side of the second gate member, and corresponding seventh and eighth cam followers being attached to an opposing side of the second gate member, the seventh and eighth cam followers oriented to travel against a fourth surface fixed inside the valve chamber, the profile of the fourth surface causing the second gate member to move toward the first gate member when the gate assembly is moved away from the closed position.

10. An expanding gate valve, comprising:
(a) a valve body having a valve chamber and inlet and outlet passages and having spaced interior sealing surfaces;
(b) a gate assembly comprising first and second gate members and being movable within the valve chamber to an open position permitting flow of fluid through the inlet and outlet passages and a closed position with the gate assembly located between the sealing surfaces and blocking the flow of fluid through the inlet and outlet passages, the gate members each defining an outer-facing surface facing in the direction of a corresponding interior sealing surface of the valve body, and an inner-facing surface facing the other gate member, the inner-facing surface of each gate member further defining an upper inclined cam surface and a lower inclined cam surface, the upper inclined cam surface symmetrical with the lower inclined cam surface about a latitudinal axis, the upper and lower inclined cam surfaces of the first gate member being symmetrical with the upper and lower inclined cam surfaces of the second gate member about a longitudinal axis, the upper and lower inclined cam surfaces disposed for engagement with opposed upper and lower wedges, respectively, and causing lateral expansion of said gate assembly responsive to engagement of the upper and lower wedges with the upper and lower inclined cam surfaces;
(c) a valve stem having driving connection with the upper wedge and the gate assembly for moving the gate assembly linearly to said open and closed positions; and
(d) at least one lateral-force-inducing member engaging the gate members and urging them toward each other at least when the gate assembly is not in the closed position;
wherein the at least one lateral-force-inducing member further comprises:
(e) a plurality of cam followers attached to interior surfaces of the valve chamber, the cam followers oriented to travel against at least two follower-engaging surfaces fixed to each side of opposing sides of both the first and second gate members, the profiles of the follower-engaging surfaces causing the first and second gate members to move toward each other when the gate assembly is moved away from the closed position.

11. An expanding gate valve, comprising:
(a) a valve body having a valve chamber and inlet and outlet passages and having spaced interior sealing surfaces;
(b) a gate assembly comprising first and second gate members each having a blocking portion longitudinally separated from a pass-through portion, the gate members being movable within the valve chamber to an open position permitting flow of fluid through the inlet passage, through the pass-through portions, and through the outlet passage, and a closed position with the blocking portion of the gate members located between the sealing surfaces and blocking the flow of fluid through the inlet and outlet passages, the gate members each defining an outer-facing surface facing in the direction of a corresponding interior sealing surface of the valve body, and an inner-facing surface facing the other gate member, the inner-facing surface of each gate member further defining first and second upper inclined cam surfaces and first and second lower inclined cam surfaces, the upper inclined cam surfaces symmetrical with the lower inclined cam surfaces about latitudinal axes, the upper and lower inclined cam surfaces of the first gate member being symmetrical with the upper and lower inclined cam surfaces of the second gate member about a longitudinal axis, the first upper and lower inclined cam surfaces disposed for engagement with opposed upper and lower closing wedges, respectively, the second upper and lower inclined cam surfaces disposed for engagement with opposed upper and lower opening wedges, respectively, and causing lateral expansion of said gate assembly responsive to engagement of the wedges with the corresponding inclined cam surfaces;
(c) a valve stem having driving connection with the upper closing wedge and the lower opening wedge and the gate assembly for moving the gate assembly linearly to said open and closed positions; and
(d) at least one lateral-force-inducing member engaging the gate members and urging them toward each other at least when the gate assembly is not in the closed or open position.

12. The expanding gate valve of claim 11, wherein the at least one lateral-force-inducing member further comprises:
(e) at least one spring engaging both the gate members.

13. The expanding gate valve of claim 12, wherein the spring comprises a snap ring.

14. The expanding gate valve of claim 11, wherein the at least one lateral-force-inducing member further comprises:

(e) a plurality of cam followers attached to opposing sides of both the first and second gate members, each cam follower oriented to travel against one of a plurality of follower-engaging surfaces fixed to interior surfaces of the valve chamber, the profiles of the follower-engaging surfaces causing the first and second gate members to move toward each other when the gate assembly is moved away from the closed position.

15. The expanding gate valve of claim 11, wherein the at least one lateral-force-inducing member further comprises:
(e) a plurality of cam followers attached to interior surfaces of the valve chamber, each cam follower oriented to travel against one of a plurality of follower-engaging surfaces fixed to opposing sides of both the first and second gate members, the profiles of the follower-engaging surfaces causing the first and second gate members to move toward each other when the gate assembly is moved away from the closed position.

16. The expanding gate valve of claim 11, wherein the lower closing wedge is attached to a bottom interior surface of the valve chamber.

17. The expanding gate valve of claim 11, wherein the upper opening wedge is attached to a top interior surface of the valve chamber.

18. The expanding gate valve of claim 11, wherein the lower closing wedge is attached to a bottom interior surface of the valve chamber and the upper opening wedge is attached to a top interior surface of the valve chamber.

* * * * *